United States Patent [19]

Quatro et al.

[11] Patent Number: 4,868,695
[45] Date of Patent: Sep. 19, 1989

[54] HEAD/ARM LOCK MECHANISM FOR A DISK DRIVE

[75] Inventors: Robert A. Quatro, Oklahoma City; Lawrence A. Wilcox, Mustang, both of Okla.

[73] Assignee: Magnetic Peripherals Inc., Minneapolis, Minn.

[21] Appl. No.: 175,448

[22] Filed: Mar. 30, 1988

[51] Int. Cl.⁴ ............................................. G11B 5/54
[52] U.S. Cl. ................................. 360/104; 335/234; 360/105
[58] Field of Search ............... 360/104, 105, 106, 109; 335/229, 230, 234, 250; 361/206, 210

[56] References Cited

U.S. PATENT DOCUMENTS

| | | | |
|---|---|---|---|
| 3,889,219 | 6/1975 | Larner | 335/234 |
| 4,523,167 | 6/1985 | Remington | 335/230 |
| 4,725,907 | 2/1988 | Jue | 360/105 |
| 4,746,886 | 5/1988 | Uetsuhara | 335/234 |
| 4,751,595 | 6/1988 | Kishi et al. | 360/105 |
| 4,782,315 | 11/1988 | Bataille et al. | 335/234 |
| 4,786,995 | 11/1988 | Stupeck et al. | 360/105 |
| 4,796,130 | 1/1989 | Shinanuki | 360/105 |

Primary Examiner—Stuart N. Hecker
Assistant Examiner—David J. Severin
Attorney, Agent, or Firm—Robert M. Angus; Joseph A. Genovese

[57] ABSTRACT

A head/arm lock mechanism includes a pawl mounted to the armature of a bistable solenoid, the armature being stable in either of two rotary positions. The armature and pawl are limited to move through an angle less than that defined by the stable positions of the armature, so that the armature is biased by the magnetic circuit of the solenoid to one or the other limit positions. When the head/arm is in position to be locked, the solenoid is energized to lock against a spacer on the head/arm and the magnetic circuit continues to hold the pawl in a lock-engaging position upon de-energization of the solenoid. When the head/arm is to be unlocked, the solenoid is again energized to unlock the pawl from the spacer and the magnetic circuit continues to hold the pawl in an unlock position upon de-energization of the solenoid.

3 Claims, 4 Drawing Sheets

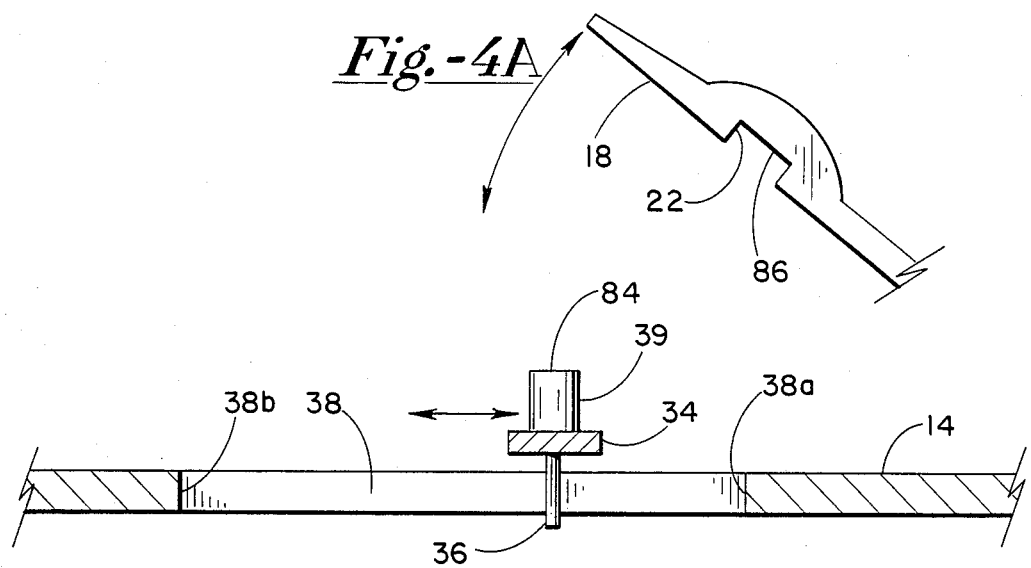
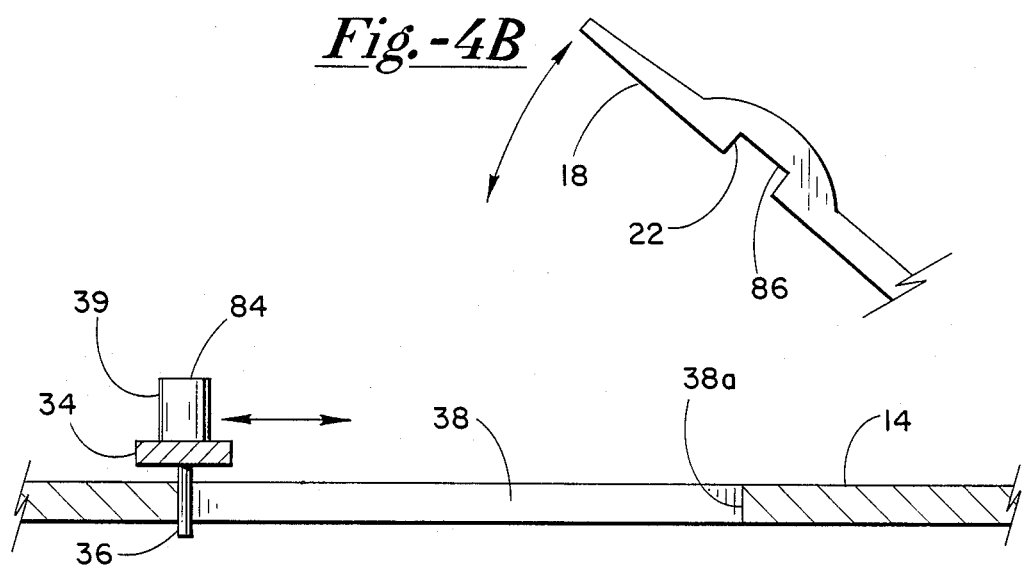
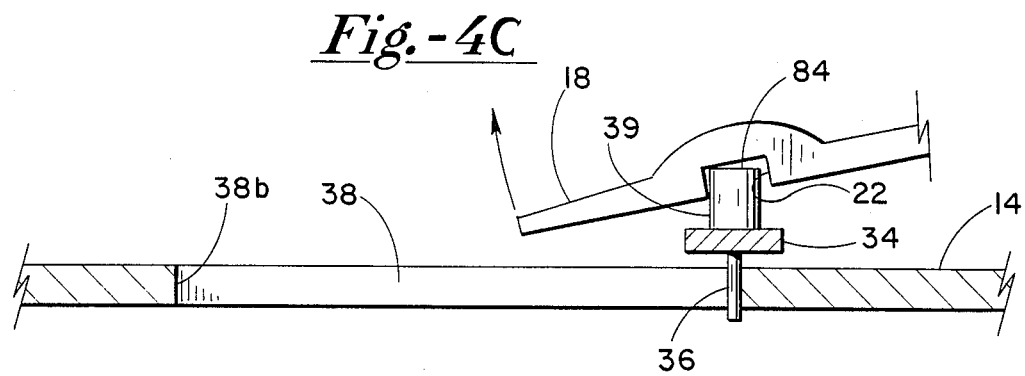

HEAD/ARM LOCK MECHANISM FOR A DISK DRIVE

BACKGROUND OF THE INVENTION

This invention relates to locking mechanisms for head/arm mechanisms of a disk drive.

In disk drives of the class wherein the head "lands" on the disk surface, it is important to employ a mechanism to lock the head in a retracted position to prevent damage to the drive during transportation and other times of nonuse. Heretofore, lock mechanisms for disk drives have operated under either of two principles. One class employs fully mechanical devices, usually operated manually by a lever or the like, which engage the arm to lock it in a retracted position. The second class employs solenoids which are usually energized in one or the other position to lock or unlock the head/arm assembly. One difficulty with the mechanical leverage locks is that the moving parts often scraped against each other, dislodging particles from the parts which contaminated the drive and media. The particles interfered with the operation of the disk drive and the flying characteristics of the head. The solenoid locks required energization to maintain the head/arm assembly in either a locked or unlocked position. The constant energization of the mechanism generated heat within the disk drive, causing yet other problems. (There is a third type of lock mechanism employing mechanical locks operated by solenoids. In reality, these "hybrid" mechanisms exhibit the adverse characteristics of both the mechanical and solenoid mechanisms by requiring constant energization in one or the other positions and by mechanical scrapping of the parts.)

Examples of these systems can be found in U.S. Pat. Nos. 4,583,142 (mechanical), 4,139,874 (solenoid) and 4,392,165 (hybrid).

SUMMARY OF THE INVENTION

The present invention is directed to a head/arm locking mechanism employing a solenoid which is energized solely to move the lock mechanism from its locked to its unlocked position, and vice versa. At other times, the solenoid is not energized. The locking mechanism does not require mechanical leverage as in prior mechanical devices, nor does it require electrical energization of the solenoid to maintain a lock or unlock position.

It is, therefore, an object of the present invention to provide a head/arm locking mechanism which dissipates as little heat as possible and does not contaminate the device.

In accordance with the present invention, a lock mechanism is provided for restraining movement of a head-arm mechanism of the disk drive. The head-arm mechanism is pivotally mounted to the frame of the disk drive and rotationally movable between a lock and an unlock position. In the lock position, the lock mechanism will restrain the head-arm mechanism from movement. The lock mechanism comprises a bistable solenoid mounted to the frame, the solenoid having an armature movable between first and second positions and a winding electrically energizable to move the armature between its first and second positions. A pawl is mounted to the armature, the pawl having an arm, which in turn has a detent. The pawl is movable between first and second rest positions as the armature is moved between its first and second positions, respectively. A spacer is mounted to the head-arm mechanism so that the detent on the pawl engages the spacer when the head-arm mechanism is in its lock position and the pawl is in its first rest position to restrain the head-arm mechanism to its lock position. A stop is mounted to the frame to engage the arm of the pawl when the pawl is in its second rest position.

One feature of the present invention resides in the fact that the bistable solenoid includes a magnetic circuit for biasing the armature to its first position when the pawl is in its first rest position and for biasing the armature to its second position when the pawl is in its second rest position.

Another feature of the present invention resides in the fact that the armature comprises a rotor arranged to rotate between first and second rotational positions separated by a predetermined angle, so that the stop and the spacer restrains the rotor to rotational movement through an angle smaller than the predetermined angle. Particularly, it is preferred that the magnetic circuit biases the rotor to rotational positions 60° apart, but the stop and pawl restrains movement to less than 60°, and preferably less than about 40°, so that the magnetic circuit continuously biases the lock mechanism toward either of its two rest positions.

BRIEF DESCRIPTION OF THE FIGURES

The above and other features of this invention will be more fully understood from the following detailed description and the accompanying drawings, in which:

FIGS. 4A–4C are views of part of the mechanism useful in explaining its operation;

DESCRIPTION OF THE PREFERRED EMBODIMENT

Figure 1:
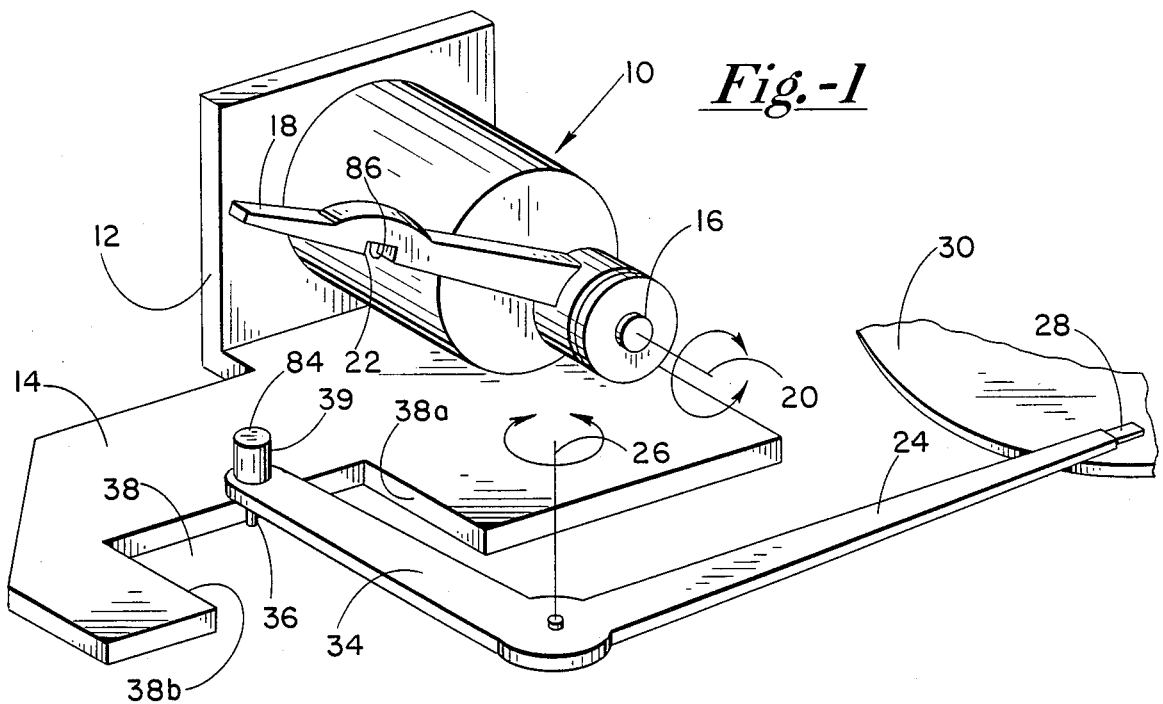
FIG. 1 is a perspective view of the head/arm lock mechanism in accordance with presently preferred embodiment of the present invention.

Referring to the drawings, and particularly to FIGS. 1 through 4, there is illustrated a lock mechanism in accordance with the presently preferred embodiment of the present invention. The mechanism includes a bistable rotary solenoid 10 mounted to upwardly extending arm 12 of bracket 14. Bracket 14 is part of the housing to which the disk 30 and head/arm mechanism 24 are mounted. The shaft 16 of solenoid 10 has a pawl 18 mounted thereto for rotary motion about the axis 20 of the solenoid 10. The underside of pawl 18 includes a detent 86 having an engaging surface 22.

A head/arm 24 is journalled to the housing for rotation about axis 26 and carries a head 28 for sweeping across the surface of a magnetic disk 30 (FIG. 2), which in turn journalled to the housing to rotate about axis 32. As shown particularly in FIG. 2, the head/arm 24 may be moved between radial positions illustrated at 24a and 24b.

Figure 2:
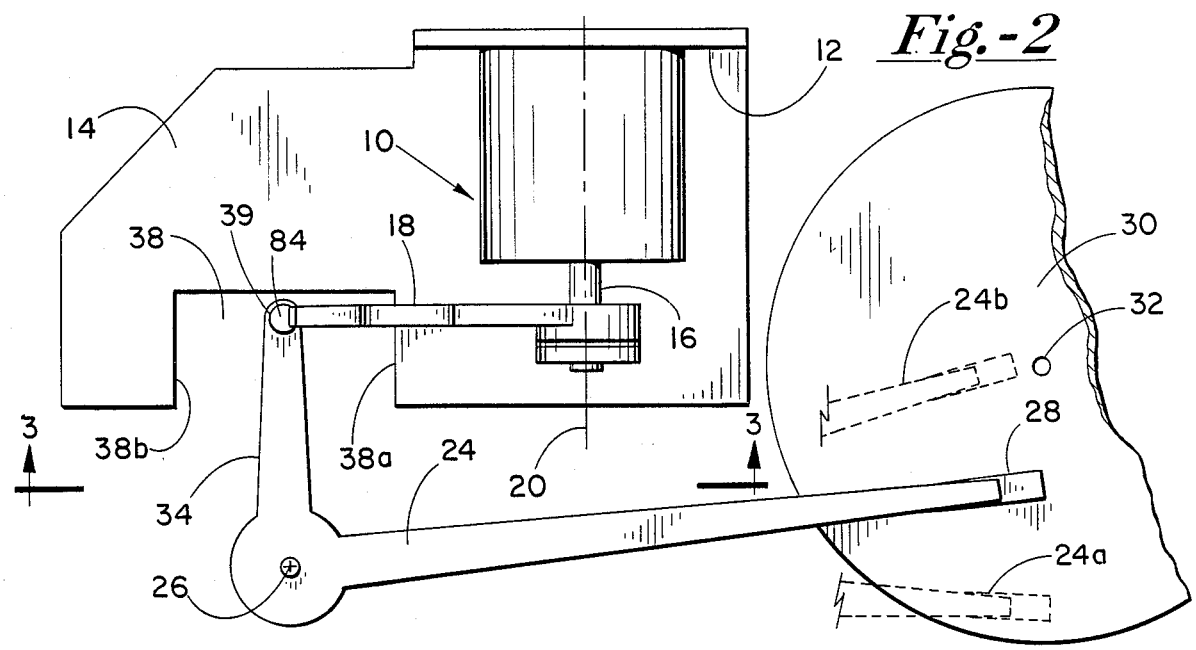
FIG. 2 is a top view of the mechanism illustrated in FIG. 1.

Stop arm 34 is fixedly mounted to head/arm 24 to rotate about axis 26 with the head/arm 24. Arm 34 carries a pin 36 (FIG. 3) extending into the notch region 38 of bracket 14. As shown particularly in FIGS. 4A through 4C, pin 36 is arranged to engage the edges 38a and 38b of notch 38 and stop arm 34 and head/arm 24 rotate about axis 26 (FIG. 2). Thus, the edge surfaces 38a and 38b form limiting stops to the rotational travel of arm 34 and 24 and thereby limiting the movement of arm 24 between the positions illustrated at 24a and 24b in FIG. 2. Spacer 39 is mounted to arm 34 so that detent 86 may engage spacer 39 when pin 36 is in a stop position against surface 38a and pawl 18 is moved by solenoid 10 to the position shown in FIG. 4c. Surface 84 of spacer 39 is arranged to engage the edge of detent 86 on the pawl, thereby limiting rotational movement of the pawl to a first rest position.

Figure 3:
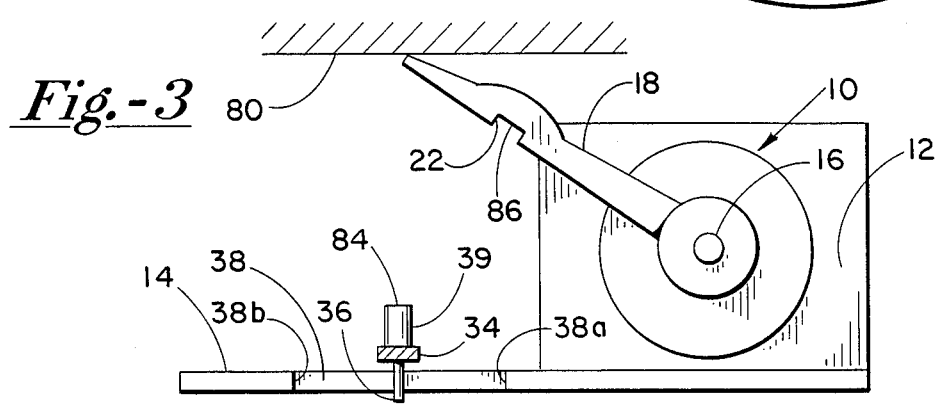
FIG. 3 is a frontal view of part of the mechanism illustrated in FIG. 1, taken at line 3—3 in FIG. 2.

Rotational movement of pawl 18 is limited to a second rest position by stop 80 on the housing. FIG. 3. Preferably, pawl 18 is limited by stop 80 and spacer 39 to a rotational movement of between 30° and 40°, as hereafter explained.

In the operation of the lock mechanism, when it is desired to lock the head/arm into its first rest position, the head/arm 24 is moved to the position 24a so that pin 36 bears against surface 38a. Solenoid 10 is energized to move pawl 18 to the first rest position illustrated in FIG. 4C so that surface 84 engages detent 86 to limit travel of the pawl and surface 22 of the detent engages stop 39 to hold the pin 36 against surface 38a in the position illustrated in FIG. 4C. Hence, the arm 34 (and arm 24) are restrained and locked in a first rest position. When it is desired to release the arm mechanism, the solenoid is again energized to move pawl 18 to the second rest position illustrated in FIG. 4A, thereby permitting the arm mechanism 34 to rotationally move about axis 26 as pin 36 moves in the notch 38 of housing 14. Thus, head/arm 24 can move rotationally about the axis 26 as illustrated in FIG. 2.

Figure 5:
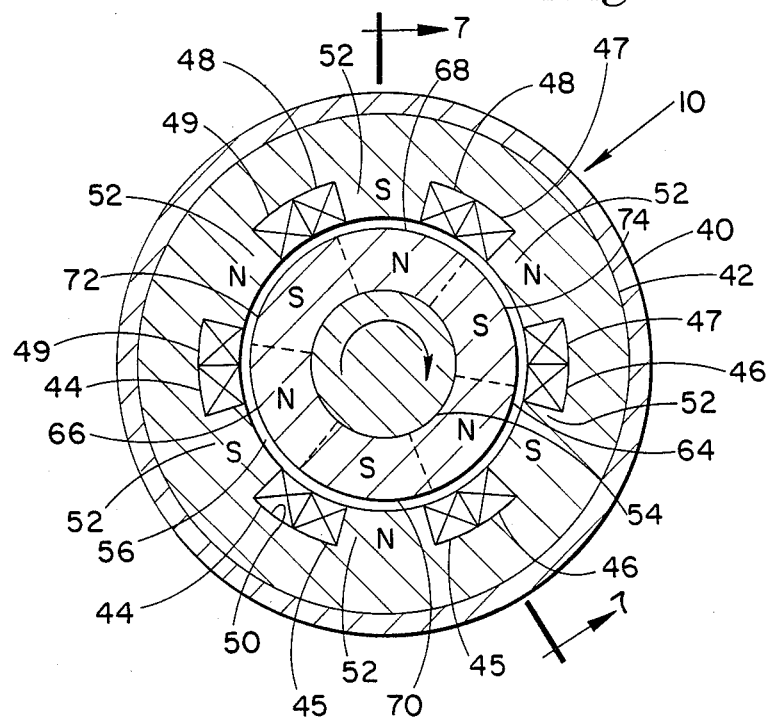
FIGS. 5–7 are views of a bistable solenoid useful in the apparatus illustrated in FIGS. 1–4, FIG. 7 being taken at line 7—7 of FIG. 5.
Figure 6:
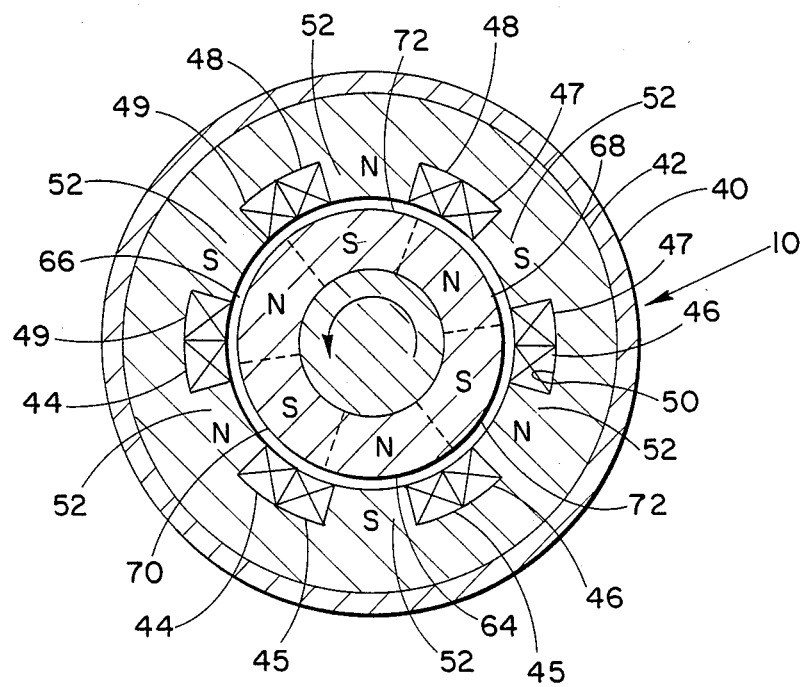
Figure 7:
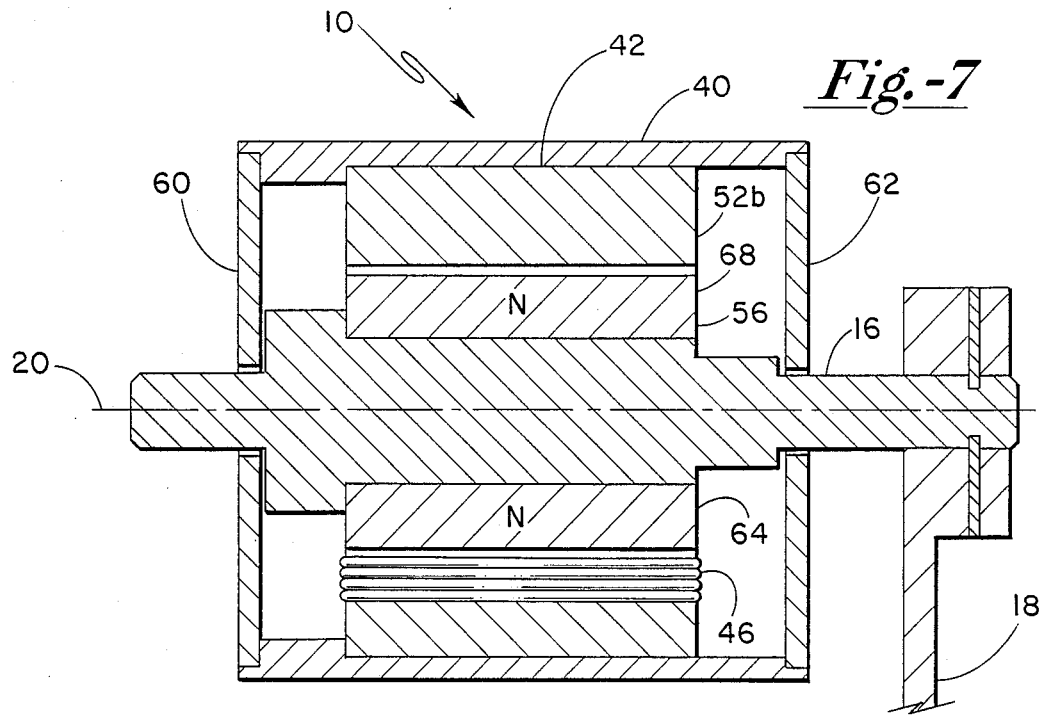
Figure 8:
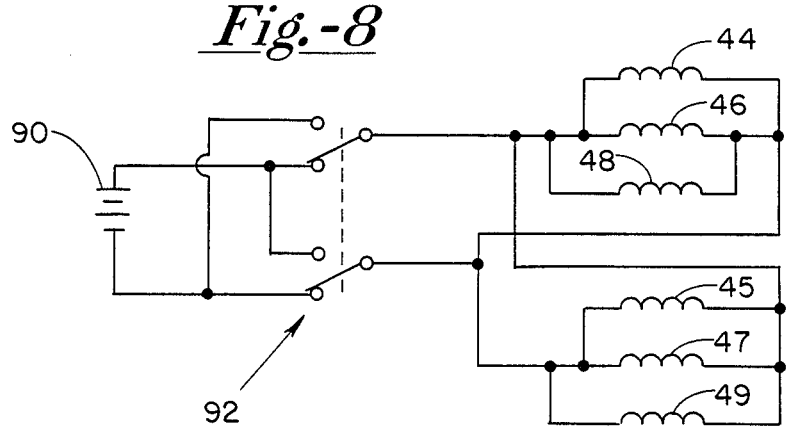
FIG. 8 is a diagram of the wiring of windings in the bistable solenoid of FIGS. 5–7.

Referring to FIGS. 5-7, the bistable rotary solenoid 10 may be explained in greater detail. Solenoid 10 comprises a housing 40 supporting a ferrous metal stator 42 therein. Windings 44-49 are wound in slots 50 of stator 42. Each coil 44-49 is wound between successive slots 50, spaced 60° apart, and surrounds one of the six ferrous lands 52. Each slot 50 containing one half of each of two of the six coils. As shown in FIG. 8, coils 44, 46 and 48 are wound opposite to windings 43, 45 and 49 so that successive lands 52 are oppositely polarized. Thus, depending upon the direction of current in the coils 44-49, alternate lands 52 will be energized as either a north magnetic pole as indicated in FIG. 5 or as a south magnetic pole as indicated in FIG. 6.

The rotor of solenoid 10 includes a shaft 54 to which the pawl 18 is affixed. A magnetic armature member 56 is fixed to shaft 54. Shaft 54 is journalled to ends 60 and 62 of housing 40 to rotate about axis 20. Magnetic member 56 is divided into six equal permanent magnetic portions, each encompassing 60° in circumference about shaft 54. Portions 64, 66 and 68 are permanent north magnetic poles, whereas alternate portions 70, 72 and 74 are permanent south magnetic poles.

In operation of the bistable solenoid, upon energization of the coils 44-49 with a D.C. current, such as source 90 and switch 92 in FIG. 8 in a manner to produce magnetic fields of the same polarity as on the opposing portion of the rotor, magnetic member 56 will attempt to rotate from one angular position to the other, such as from the position illustrated in FIG. 5 to the position illustrated in FIG. 6. We prefer to limit rotation of the rotor to between about 30° and 40° so that the limit positions of the rotor position the center of the magnetic pole portions between 10° and 15° of the center of lands 52. Hence stop 80 limits rotational movement of pawl 18 to one angular position and surface 86 of the pawl 18 engages spacer 39 to limit movement of the pawl to the second angular position. Upon de-energization of the coils 44-49, such as by moving switch 92 to the center position, each permanent magnetic pole on the rotor will continue to attract to the nearest land 52, maintaining the rotor in its stable position. Hence, the magnetic circuit formed by the permanent magnetic pole of armature 56 and the lands 52 bias the rotor to one or the other rest positions defined by the limits of stop 80 and spacer 39. Upon energization of coils 44-49 with a D.C. current in an opposite direction, such as by operating switch 92 to its position opposite that shown in FIG. 8, the solenoid will rotate to its original position, as from FIG. 6 to FIG. 5.

The present invention thus provides an effective lock mechanism for a head/arm assembly to lock the head/arm assembly without employing mechanical leveraging devices which create friction and contaminate the drive, nor with the use of a solenoid which is continuously energized to hold the lock in one position or the other. Thus, the present invention provides a head/arm lock mechanism which does not appreciably dissipate heat into the diskdrive due to continuous energization, nor contaminate the drive due to physical scraping of parts. The invention is effective in operation, and inexpensive to produce.

This invention is not to be limited by the embodiment shown in the drawings and described in the description, which is given by way of example and not of limitation, but only in accordance with the scope of the appended claims.

What is claimed is:

1. A lock mechanism for restraining movement of a head-arm mechanism of a disk drive having a frame, said head-arm mechanism being supported by said frame, said head-arm mechanism being movable between a lock position wherein said lock mechanism restrains said head-arm mechanism from movement and an unlock position, said lock mechanism comprising:

bistable rotary solenoid means mounted to said frame, said solenoid means having
a rotor arranged to rotate between first and second rotational positions spaced apart by a predetermined angle,
winding means electrically energizable to move said rotor from its first position to its second position and electrically energizable to move said rotor from its second position to its first position, and
permanent magnet means;
pawl means mounted to said rotor, said pawl means having an arm having a detent, said pawl means being movable between first and second rest positions as said rotor is moved between its first and second positions, respectively, said permanent magnet means biasing said rotor to its first position when said pawl means is in its first rest position and biasing said rotor to its second position when said pawl means is in its second rest position;
spacer means mounted to said head-arm mechanism, said detent on said pawl means engaging said spacer means when said head-arm mechanism is in its lock position and said pawl means is in its first rest position to restrain said head-arm mechanism to its lock position; and stop means mounted to said frame for engaging said arm of said pawl means when said pawl means is in its second rest position, said stop means and said spacer means restraining said rotor to rotational movement through said predetermined angle.

2. Apparatus according to claim 1 wherein said rotor is segmented into permanent magnet pole 60° apart and said stop means and said spacer means restrains said pawl means from movement through an angle of less than 60°.

3. Apparatus according to claim 2 wherein said pawl means is restrained from movement to an angle less than 40°.

* * * * *